(12) United States Patent
Suh et al.

(10) Patent No.: US 9,769,757 B2
(45) Date of Patent: Sep. 19, 2017

(54) METHOD AND APPARATUS FOR SAVING POWER IN ACCESS POINT NETWORK

(71) Applicant: Samsung Electronics Co., Ltd., Gyeonggi-do (KR)

(72) Inventors: Ji-Eun Suh, Gyeonggi-do (KR); Ik-Seon Kang, Gyeonggi-do (KR); Ah-Ram Seo, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 216 days.

(21) Appl. No.: 14/295,870

(22) Filed: Jun. 4, 2014

(65) Prior Publication Data
US 2015/0163744 A1    Jun. 11, 2015

(30) Foreign Application Priority Data

Dec. 5, 2013   (KR) .................. 10-2013-0150535

(51) Int. Cl.
*H04W 52/02*   (2009.01)

(52) U.S. Cl.
CPC .... *H04W 52/0235* (2013.01); *H04W 52/0254* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 5,821,924 A | * | 10/1998 | Kikinis | ............ G03G 15/2003 345/212 |
| 2010/0322217 A1 | * | 12/2010 | Jin | ..................... H04W 60/00 370/338 |
| 2012/0129567 A1 | * | 5/2012 | Kimura | ............ H04W 52/244 455/522 |
| 2012/0220351 A1 | | 8/2012 | Kerai et al. | |
| 2013/0182693 A1 | * | 7/2013 | Sperling | ................ H04W 12/06 370/338 |
| 2014/0189604 A1 | * | 7/2014 | Garrison | ............... G06F 3/0488 715/863 |
| 2015/0029915 A1 | * | 1/2015 | Gobriel | .................. H04L 12/12 370/311 |

* cited by examiner

*Primary Examiner* — Christine Duong
(74) *Attorney, Agent, or Firm* — The Farrell Law Firm, P.C.

(57) ABSTRACT

An apparatus for saving power in an access point network is provided. The apparatus includes a communication unit that transmits/receives data to/from an access point device through a wireless short distance communication scheme; an input unit that receives a user input; and a controller that controls to determine whether there is a user input through the input unit, generates a deactivation request message including information related to service non-use of the access point device when the user input is not detected for a preset time or longer, and transmits the deactivation request message to the access point device through the communication unit.

11 Claims, 12 Drawing Sheets

METHOD AND APPARATUS FOR SAVING POWER IN ACCESS POINT NETWORK

PRIORITY

This application claims priority under 35 U.S.C. §119(a) to Korean Application Serial No. 10-2013-0150535, which was filed in the Korean Intellectual Property Office on Dec. 5, 2013, the entire content of which is incorporated herein by reference.

BACKGROUND

1. Field of the Disclosure

The present disclosure generally relates to a method and an apparatus for saving power of an access point device and a user device in an access point network.

2. Description of the Related Art

As various services and additional functions provided by an electronic device (for example, a smart phone) are gradually expanded, the electronic device now additionally includes a wireless Local Area Network (LAN) module as well as a mobile communication module, and accordingly provides various communication functions. For example, a mobile electronic device includes the mobile communication module to provide a mobile communication service and includes the wireless LAN module to provide a packet data service. Further, an electronic device, such as a notebook having the wireless LAN module, may receive the packet data service without regard to time and place through an Access Point (AP) function of the mobile electronic device.

The Access Point (referred to herein as an electronic device) providing the AP function is a network device managing a wired/wireless connection between electronic devices and, for example, serves to connect a wired LAN and a wireless LAN.

Meanwhile, for example, when the AP function is activated in a mobile electronic device, power consumption of the electronic device increases according to an execution of the AP function. More specifically, when the AP function is activated in the mobile electronic device, the mobile electronic device may provide the packet data service to one or more different electronic devices (for example, this may be referred to as a "mobile hotspot" service) connected to the mobile electronic device. As described above, when the AP function is activated in the electronic device, it is required to drive a modem to provide the packet data service to another electronic device, thereby additionally consuming power in providing the AP function.

Further, according to the provision of the AP function of the mobile electronic device, power consumption of the mobile electronic device may increase in proportion to a number of electronic devices connected to the mobile electronic device.

Thus, the mobile electronic device has a need to reduce power since it operates with battery power in many cases.

In the conventional technologies, when a mobile electronic device activates the AP function, a modem function is activated even in a state where there is no electronic device connected with the mobile electronic device or where electronic devices connected with the mobile electronic device do not use the data network, thereby generating unnecessary power consumption.

SUMMARY

The present disclosure has been made to address at least the above problems and disadvantages, and to provide at least the advantages described below. According, aspects of the present disclosure provide a method and an apparatus for saving power in an access point network which can reduce power consumption of an AP device when electronic devices connected with the AP device do not use the data network or there is no electronic device connected with the AP device.

In accordance with an aspect of the present disclosure, a method of saving power in an access point network is provided. The method includes determining whether there is a user input in an electronic device; when the user input is not detected for a preset time or longer, generating a deactivation request message including information related to a service non-use of an access point device; and transmitting the generated deactivation request message to the access point device.

In accordance with another aspect of the present disclosure, a method of saving power in an access point network is provided. The method includes accessing an access point device through wireless short distance communication by a user device; determining whether there is a user input by the user device; when there is the user input as a result of the determination, generating an activation request message including information related to service use of the access point device; and transmitting the generated activation request message to the access point device through the wireless short distance communication.

In accordance with another aspect of the present disclosure, a method of saving power in an access point network is provided. The method includes determining whether a deactivation request message is received from an external electronic device by an access point device; and when the deactivation request message is received, performing one or more operations related to reduction of power consumed by the access point device.

In accordance with another aspect of the present disclosure, an apparatus for saving power in an access point network is provided. The apparatus includes a communication unit that transmits/receives data to/from an access point device through a wireless short distance communication scheme; an input unit that receives a user input; and a controller that controls to determine whether there is a user input through the input unit, generates a deactivation request message including information related to service non-use of the access point device when the user input is not detected for a preset time or longer, and transmits the deactivation request message to the access point device through the communication unit.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE PRESENT DISCLOSURE

Figure 1:
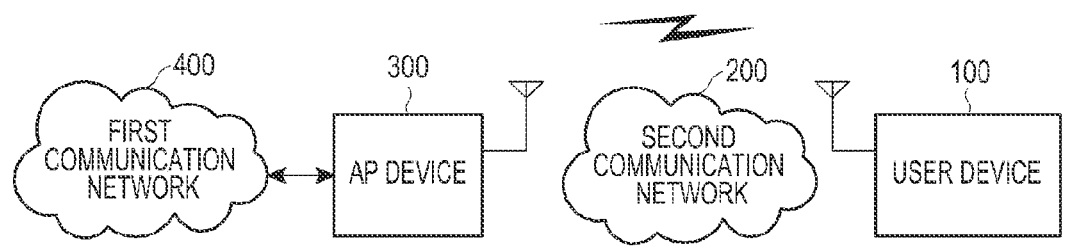
FIG. 1 illustrates an example in which an AP device and a user device according to an embodiment of the present disclosure are wirelessly connected.

Hereinafter, various embodiments will be described in detail with reference to the accompanying drawings. The embodiments will be described in enough detail to enable those skilled in the art implement the various embodiments of the present disclosure. It should be understood that although various embodiments of the present disclosure are different from each other, they need not be mutually exclusive. For example, in regard to an embodiment, specific forms, structures, and characteristics described herein may be realized through another embodiment without departing from the spirit and scope of the present disclosure. Moreover, it should be understood that locations or arrangements of separate elements within the disclosed embodiments can be changed without departing from the spirit and scope of the present disclosure. Accordingly, detailed descriptions which will be given below are not intended to be restrictive, and the scope of the present disclosure, if properly described, should be limited only by the accompanying claims and equivalents thereof. Similar reference numerals shown in the drawings denote elements performing an identical or similar function in several aspects.

While terms including ordinal numbers, such as "first" and "second," etc., may be used to describe various components, such components are not limited by the above terms. The terms are used merely for the purpose to distinguish an element from the other elements. For example, a first element could be termed a second element, and similarly, a second element could be also termed a first element without departing from the scope of the present disclosure.

As used herein, the term "and/or" includes any and all combinations of one or more of the associated listed items.

The terms used in this application are for the purpose of describing particular embodiments only and are not intended to be limiting of the disclosure. As used herein, the singular forms are intended to include the plural forms as well, unless the context clearly indicates otherwise. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein have the same meaning as commonly understood by those of skill in the art. Such terms as those defined in a generally used dictionary are to be interpreted to have the meanings equal to the contextual meanings in the relevant field of art, and are not to be interpreted to have ideal or excessively formal meanings unless clearly defined in the present specification. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the present disclosure disclose an apparatus and a method for reducing unnecessary power consumption of an electronic device (referred to herein as an Access Point (AP) device) by allowing an AP function to be automatically controlled (for example, AP function to be turned on/off) in the AP device providing the AP function to one or more electronic devices connected to the AP device itself according to a state of the connected electronic devices.

In the following description, the one or more electronic devices receiving the AP function from the AP device will be referred to as a "user device". However, the AP device and the user device are not limited to a particular type of device, and any type of electronic device having a wireless communication function can be the AP device or the user device according to an embodiment of the present disclosure.

In various embodiments of the present disclosure, in order to reduce unnecessary power consumption of the AP device, a message (for example, an activation request message or a deactivation request message) for controlling the AP function may be automatically transmitted to the AP device from the user device according to a data utilization state or mode of the user device. As described above, as the AP device receives the message for controlling the AP function from the user device to control the AP function, the unnecessary power consumption of the AP device can be reduced. The message transmitted to the AP device from the user device may be transmitted in various wireless communication schemes.

The AP device and the user device according to the embodiment of the present disclosure may be a random electronic device including a wireless communication means as described above, and may include, for example, a digital camera, a smart phone, a mobile phone, a game machine, a TeleVision (TV), a display device, a heads-up display unit for a vehicle, a notebook computer, a laptop computer, a tablet computer, a Personal Media Player (PMP), a Personal Digital Assistant (PDA), a navigation device, an appcessory device, and a wearable device. Further, the AP device and the user device may be a flexible device or a flexible display device. In addition, the AP device and the user device may be implemented as a portable electronic device of a pocket size having a wireless communication function. For example, the AP device and the user device may be a hand-held phone.

According to an embodiment of the present disclosure, an activation request message making a request for activating the AP function of the AP device and a deactivation request message making a request for deactivating the AP function of the AP device may include, for example, a code or an indicator.

The user device according to the embodiment of the present disclosure may selectively transmit the activation request message or the deactivation request message to the AP device through a first wireless short distance communication. Further, when the AP function of the AP device is activated, the user device may use an AP service through a second wireless short distance communication. As described above, the first wireless short distance communication may be used when the user device transmits the activation request message or the deactivation request message to the AP device, and the second wireless short distance communication may be used when the user device uses the AP service provided by the AP device of which the AP function is activated. The first wireless short distance communication and the second wireless short distance communication may support different types of wireless short distance communication, but are not limited thereto and may support the same wireless communication scheme.

The first wireless short distance communication and the second wireless short distance communication may support one of communication schemes included in the standard (IEEE 802.xx.xx) of the Institute of Electrical and Electronics Engineers (IEEE). For example, the first wireless short distance communication and the second wireless short distance communication may support communication schemes, such as Global System for Mobile communications (GSM), Code Division Multiple Access (CDMA), Wideband CDMA (WCDMA), Wireless LAN (WLAN), Wi-Fi, Wireless broadband (Wibro), World Interoperability for Microwave Access (WIMAX), High Speed Downlink Packet Access (HSDPA), Long Term Evolution (LTE), Bluetooth, Zigbee, Ultra Wideband (UWB), Personal Space Communication (PSC), Infrared Data Association (IrDA), Wi-Fi Direct communication, Near Field Communication (NFC) and the like, but are not limited thereto.

Meanwhile, in order to reduce power consumed by the AP device wirelessly connected to the user device according to the embodiment of the present disclosure, the user device determines whether the user device uses the AP function and automatically transmits a message (for example, activation request message or deactivation request message) for controlling the AP function based on the determination to the AP device. A method of determining whether to use the AP function may be implemented in various ways.

For example, the user device may determine whether to use the AP function by determining whether a user input through an input unit such as a touch screen included in the user device has not been detected for a preset time. The preset time may be stored in advance in a storage unit included in the user device by a user or a manufacturer of the user device.

For example, when the user device detects the user input within the preset time, the user device may generate the deactivation request message including non-use intention information for informing of an intention not to use the AP service and transmit the deactivation request message to the AP device. Accordingly, the AP device may turn off the AP function according to the reception of the deactivation request message, thereby reducing unnecessary power consumption.

The user device according to the embodiment of the present disclosure may generate and transmit a deactivation request message including power reduction information instructing at least one operation for reducing power of the AP device related to the AP function as well as the non-use intention information.

The AP device according to the embodiment of the present disclosure may receive the deactivation request message from the user device wirelessly connected to the AP device and identify the intention of the user device not to use the AP service based on the non-use intention information included in the deactivation request message.

The AP device may perform at least one operation for reducing power consumed in association with the AP function according to the power reduction information. The power reduction information may be stored in advance in the AP device. Further, the power reduction information may be generated by the user device and included in the deactivation request message received from the user device by the AP device.

When the power reduction information is included in the deactivation request message received from the user device, the AP device may perform at least one operation for reducing power consumed in association with the AP function. The operation for reducing power corresponds to an operation performed by the AP device and may include at least one of operations described in the following embodiments.

The operation for reducing power of the AP device according to an embodiment of the present disclosure may be an operation of blocking power consumed for the AP service. For example, the AP device may block power supplied for servicing the AP function to the user device. Further, the AP device may block power supplied to a short distance communication module performing the AP function.

The operation for reducing power of the AP device according to another embodiment of the present disclosure may switch the AP function to a power sleep state. The power sleep state may include a standby state. For example, the AP device may switch an operation of the short distance communication module performing the AP function of the AP device to the power sleep state. Further, the AP device may switch entire operations of the AP device to the power sleep state.

The operation for reducing power of the AP device according to another embodiment of the present disclosure may be an operation of switching the AP function to an idle state. For example, the AP device may switch the AP function to the idle state while maintaining other functions which are being executed in the AP device. Further, when the AP device does not detect the user input for the preset time, the AP device may switch a state of the AP function to a deep idle state from the idle state. The preset time may be stored in advance in a storage unit included in the AP device by a user or a manufacturer of the user device.

The operation for reducing power of the AP device according to another embodiment of the present disclosure may be an operation of stopping data transmission/reception through the AP service. The AP device may stop wireless data transmission/reception with one or more user devices which are using the AP service. The stopping of the wireless data transmission/reception may include disconnecting, by the AP device, a wireless connection with the one or more user devices which are using the AP service. For example, when the AP device receives a deactivation request message from one or more of a plurality of user devices wirelessly connected to the AP service, the AP device may stop or end the wireless connection for the AP service with the corresponding user device having transmitted the deactivation request message. Accordingly, the AP device can reduce power consumed for the AP function by stopping or ending the wireless connection with the corresponding user device having transmitted the deactivation request message among the plurality of user devices.

Further, according to another embodiment of the present disclosure, the user device may be wirelessly connected to the AP device through the first wireless short distance communication before receiving the AP function from the AP device. The user device may transmit the activation message making a request for activating the AP function in the AP device through the first wireless short distance communication. The first wireless short distance communication is a low power short distance communication, for example, Bluetooth, Bluetooth Low Energy (BLE), Zigbee, Ultra WideBand (UWB), Personal Space Communication (PSC) and the like.

The user device may determine whether a user input has been detected while the user device operates in a predetermined state. The predetermined state of the user device may include at least one of a power sleep state, a standby state, an idle state, and a deep idle state. As a result of the determination, when the user input has been detected, the user device may generate the activation request message including use intention information expressing a user's intention to use the AP service of the AP device.

Then, the user device may transmit the generated activation request message to the AP device through the first wireless short distance communication. As described above, the first wireless short distance communication may be implemented in various communication schemes, for example, low power wireless short distance communication schemes.

When the AP device activates the AP function according to the received activation request message, the user device may be connected to the AP device through the first wireless short distance communication or the second wireless short distance communication different from the first wireless short distance communication and uses the AP service.

The user device according to the embodiment of the present disclosure may selectively transmit the activation request message or the deactivation request message to the AP device through first wireless short distance communication according to an operation state of the user device. Accordingly, the AP device may activate the AP function by receiving the activation request message from the user device. Then, the user device may use the AP service provided by the AP device having the activated AP function through the second wireless short distance communication.

Further, the AP device may deactivate the AP function by receiving the deactivation request message from the user device and perform at least one operation which can reduce power consumed in association with the AP function as described above. In addition, the user device may transmit the generated deactivation request message to the AP device through the first wireless short communication or the second wireless short distance communication different from the first wireless short distance communication.

According to an embodiment of the present disclosure, even though the user separately turns on/off the AP function of the AP device which is connected with at least one electronic device to provide the AP function, the AP device automatically recognizes whether the connected electronic device uses the data network and turns on/off the AP function, thereby reducing unnecessary power consumption.

Further, according to an embodiment of the present disclosure, when the electronic device connected with the AP device enters a state (for example, the standby mode) where the user does not use the electronic device, the electronic device transmits a request message making a request for deactivating the AP function to the AP device to turn off the AP function and thus reduce power consumed in association with the AP function of the AP device.

Hereinafter a method and an apparatus for reducing power in an AP network according to an embodiment of the present disclosure will be described in detail with reference to FIGS. 1 to 13.

FIG. 1 illustrates an example in which the AP device and the user device according to an embodiment of the present disclosure are wirelessly connected.

Referring to FIG. 1, an AP network according to an embodiment of the present disclosure includes a user device 100 receiving the AP service from an AP device 300 through a second communication network 200 and the AP device 300 that is connected to a first communication network 400 and provides the AP service to the user device 100 through the second communication network 200.

The AP device 300 may be connected to a first communication network 400 through a wired cable or wirelessly. The first communication network 400 includes a network which can be connected to another electronic device (for example, a service device or another user device) and an Internet network. For example, the AP device 300 may be connected to the first communication network 400 through at least one of a mobile communication module, a wired LAN module, a wireless LAN module, and a short distance communication module included in the AP device 300.

Further, the AP device 300 may be wirelessly connected to the user device 100 through the same communication scheme as that used for the connection with the first communication network 400 or through the second communication network 200 which is different from that of the first communication network 400. For example, the AP device 300 may be connected to the user device 100 through the first communication network 400 such as mobile communication or connected to the user device 100 through the second communication network 200 such as wireless LAN communication (for example, Wi-Fi) and lower power short distance communication (for example, Bluetooth Low Energy (BLE) communication).

As described above, the user device 100 may be wirelessly connected to the AP device 300 through the second communication network 200 and determine whether a user input is detected while the user device 100 operates in a predetermined state. As a result of the determination, when the user device 100 detects the user input, the user device 100 generates an activation request message including use intention information expressing a user's intention to use the AP service of the AP device 300. The user device 100 transmits the generated activation request message to the AP device 300 through the second communication network 200.

The AP device 300 determines whether the activation request message is received from the wirelessly connected user device 100 through the second communication network 200. As a result of the determination, when the activation request message is received from the user device 100, the AP device 300 activates the AP function according to the use intention information included in the activation request message. When the AP function of the AP device 300 is activated, the user device 100 transmits/receives data to/from the first communication network 400 through the AP function of the AP device 300.

Although the second communication network 200 is illustrated as one communication network in FIG. 1, two or more communication schemes may be included. According the embodiment of the present disclosure, the second communication network 200 may include two or more different communication schemes in which a communication scheme (for example, BLE communication scheme) transmitting the activation message and a communication scheme (for example, Wi-Fi communication scheme) providing the AP function are different from each other.

Meanwhile, the user device 100 may determine whether a user input has not been detected for a preset time or longer. As a result of the determination, when the user device 100 detects the user input for the preset time or longer, the user device 100 generates a deactivation request message including non-use intention information expressing a user's intention not to use the AP service of the AP device 300. The preset time may be stored in advance in a storage unit included in the user device by a user or a manufacturer of the user device.

Further, the user device 100 may further include power reduction information instructing at least one operation for reducing power consumed in association with the AP function of the AP device 300 to generate the deactivation request message. The user device 100 transmits the generated deactivation request message to the AP device 300 through the second communication network 200.

The AP device 300 determines whether the deactivation request message is received from the wirelessly connected user device 100 through the second communication network 200. The wireless communication scheme of the second communication network 200 may be the same or different from the communication scheme of the first communication network 400. As a result of the determination, when the deactivation request message is received from the user device 100, the AP device 300 determines the user's intention not to use the AP service in the user device based on the non-use intention information included in the deactivation request message. The AP device 300 deactivates the AP function according to the non-use intention information included in the deactivation request message, and the AP device 300 performs at least one operation for reducing power consumed in association with the AP function according to the power reduction information. The power reduction information may be stored in advance in the AP device 300. Further, the power reduction information may be generated by the user device 100 and included in the deactivation request message received from the user device 100 by the AP device 300.

Figure 2:
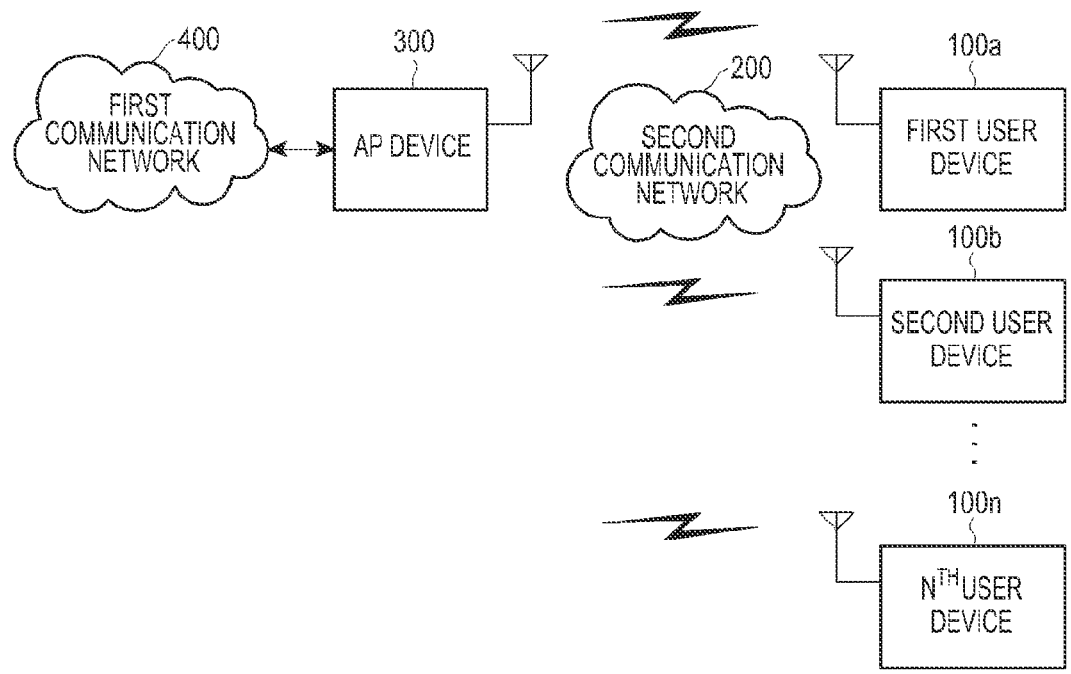
FIG. 2 illustrates an example in which an AP device and a plurality of user devices according to another embodiment of the present disclosure are wirelessly connected.

FIG. 2 illustrates an example in which the AP device and a plurality of user devices according to another embodiment of the present disclosure are wirelessly connected.

Referring to FIG. 2, an AP network according to another embodiment of the present disclosure includes a plurality of user devices 100a, 100b, . . . 100n that receive the AP service from the AP device 300 through the second communication network 200 and the AP device 300 that is connected to the first communication network 400 and provides the AP service to each of the plurality of user devices 100a, 100b, . . . 100n through the second communication network 200.

At least one of the plurality of user devices 100a, 100b, . . . 100n determines whether a user input is detected while the user devices operate in a predetermined state. As a result of the determination, when the at least one of the plurality of user devices 100a, 100b, . . . 100n detects the user input, the user device 100 generates an activation request message including use intention information expressing a user's intention to use the AP service of the AP device 300. At least one of the plurality of user devices 100a, 100b, . . . 100n having generated the activation request message transmits the activation request message to the AP device 300 through the second communication network 200.

The AP device 300 determines whether the activation request message is received from at least one of the plurality of wirelessly connected user devices 100a, 100b, . . . 100n through the second communication network 200. As a result of the determination, when the activation request message is received from at least one of the plurality of user devices 100a, 100b, . . . 100n, the AP device 300 activates the AP function according to the use intention information included in the activation request message. When the AP function of the AP device 300 is activated, the at least one of the plurality of user devices 100a, 100b, . . . 100n having transmitted the activation request message transmits/receives data to/from the first communication network 400 by using the AP service of the AP device 300 having the activated AP function. Further, when the activation request message is received from at least one of the plurality of user devices 100a, 100b, . . . 100n, the AP device 300 activates the AP function by processing the received activation request message.

Meanwhile, at least one of the plurality of user devices 100a, 100b, . . . 100n may determine whether a user input is not detected for a preset time or longer. As a result of the determination, when the user input is not detected by at least one of the plurality of user devices 100a, 100b, . . . 100n for the preset time or longer, the at least one of the plurality of user devices 100a, 100b, . . . 100n generates the deactivation request message including non-use intention information expressing a user's intention not to use the AP service of the AP device 300. The preset time may be stored in advance in a storage unit included in the user device by a user or a manufacturer of the user device.

Further, at least one of the plurality of user devices 100a, 100b, . . . 100n may further include power reduction information instructing at least one operation for reducing power consumed in association with the AP function of the AP device 300 to generate the deactivation request message. The at least one of the plurality of user devices 100a, 100b, . . . 100n transmits the generated deactivation request message to the AP device 300 through the second communication network 200.

The AP device 300 determines whether the deactivation request message is received from at least one of the plurality of wirelessly connected user devices 100a, 100b, . . . 100n through the second communication network 200. As a result of the determination, when the deactivation request message is received from at least one of the plurality of user devices 100a, 100b, . . . 100n, the AP device 300 determines the intention of at least one of the plurality of user devices 100a, 100b, . . . 100n not to use the AP service based on the non-use intention information included in the deactivation request message. The AP device 300 deactivates the AP function according to the non-use intention information included in the deactivation request message. Further, the AP device 300 performs at least one operation for reducing power consumed in association with the AP function according to the power reduction information. The power reduction information may be stored in advance in the AP device 300. Further, the power reduction information may be included in the deactivation request message received from the at least one of the plurality of user devices 100a, 100b, . . . 100n by the AP device 300.

In addition, when the AP device 300 having the activated AP function receives the deactivation request message from the at least one of the plurality of user devices 100a, 100b, . . . 100n, the AP device 300 determines whether there are one or more other user devices which are using the AP service other than the corresponding user device having transmitted the deactivation request message. When there are one or more other user devices which are using the AP service of the AP device 300, the AP device 300 may not deactivate the AP function by not processing the deactivation request message. When there are no other user devices which are using the AP service of the AP device 300, the AP device 300 deactivates the AP function by processing the inactivation request message.

Further, when the AP device receives the deactivation request messages from all the plurality of user devices 100a, 100b, . . . 100n which are using the AP service of the AP device 300, the AP device 300 deactivates the AP function by processing the deactivation request messages.

Figure 3:
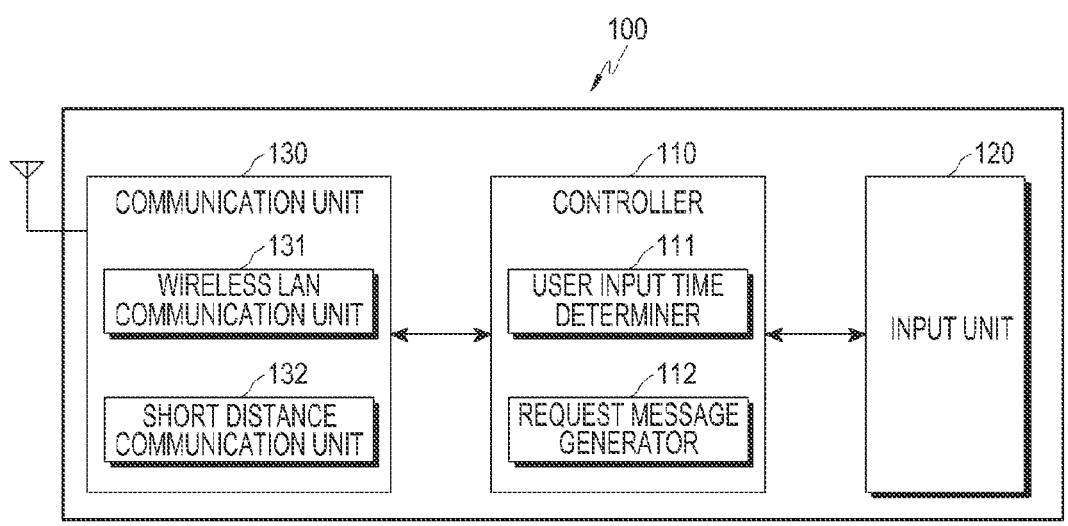
FIG. 3 is a block diagram illustrating a detailed structure of a user device according to an embodiment of the present disclosure.

FIG. 3 is a block diagram illustrating a detailed structure of the user device according to an embodiment of the present disclosure.

Referring to FIG. 3, the user device 100 according to the embodiment of the present disclosure includes an input unit 120, a controller 110, and a communication unit 130.

The input unit 120 may be included in the user device 100 to receive a user input or may receive a user input through an input device of another external electronic device connected to the user device 100.

The controller 110 includes a user input time determiner 111 and a request message generator 112.

The user input time determiner 111 determines whether a user input is detected through the input unit 120 while the user device 100 operates in a predetermined state. As a result of the determination, when the user input is detected, the user input time determiner 111 transmits a determination result to the request message generator 112.

Further, the user input time determiner 111 determines whether the user input is not detected for a preset time or longer through the input unit 120. As a result of the determination, when the user input is not detected for the preset time or longer, the user input time determiner 111 transmits a determination result to the request message generator 112. The preset time may be stored in advance in a storage unit included in the user device by a user or a manufacturer of the user device.

The request message generator 112 generates an activation request message including use intention information expressing a user's intention to use the AP service of the AP device according to the determination result transmitted from the user input time determiner 111. The request message generator 112 performs a control such that the activation request message is transmitted to the AP device through the communication unit 130, which includes a wireless LAN communication unit 131 and a short distance communication unit 132. At this time, the activation request message may be transmitted through the short distance communication unit 132 of the communication unit 130 and the AP service may be provided through the wireless LAN communication unit 130 of the communication unit 130.

The request message generator 112 generates a deactivation request message including non-use intention information expressing a user's intention not to use the AP service of the AP device according to the determination result transmitted from the user input time determiner 111. Further, the request message generator 112 further includes power reduction information instructing at least one operation for reducing power consumed in association with the AP function of the AP device within the deactivation request message. Further, the request message generator 112 performs a control such that the deactivation request message is transmitted to the AP device through the communication unit 130. The deactivation request message may be transmitted through the short distance communication unit 132 of the communication unit 130.

The wireless LAN communication unit 131 wirelessly accesses the AP service provided by the AP device according to a control of the controller 110 to provide the function of allowing the access to the communication network such as the Internet network. The wireless LAN communication unit 131 may support a wireless LAN standard (IEEE802.11x) of the Institute of Electrical and Electronics Engineers (IEEE). For example, the wireless LAN communication unit 131 may support WLAN, Wibro, Wimax, HSDPA, GSM, CDMA, WCDMA, LTE and the like, but is not limited thereto.

The short distance communication unit 132 is wirelessly connected to the AP device according to a control of the controller 110 to transmit the activation request message or deactivation request message generated by the controller 110 to the AP device. The short distance communication unit 132 may include communication schemes such as Bluetooth, BLE 4.x, Zigbee, UWB, PSC, Radio Frequency IDentification (RFID), IrDA, Wi-Fi Direct communication, NFC, and visible light communication.

Figure 4A:
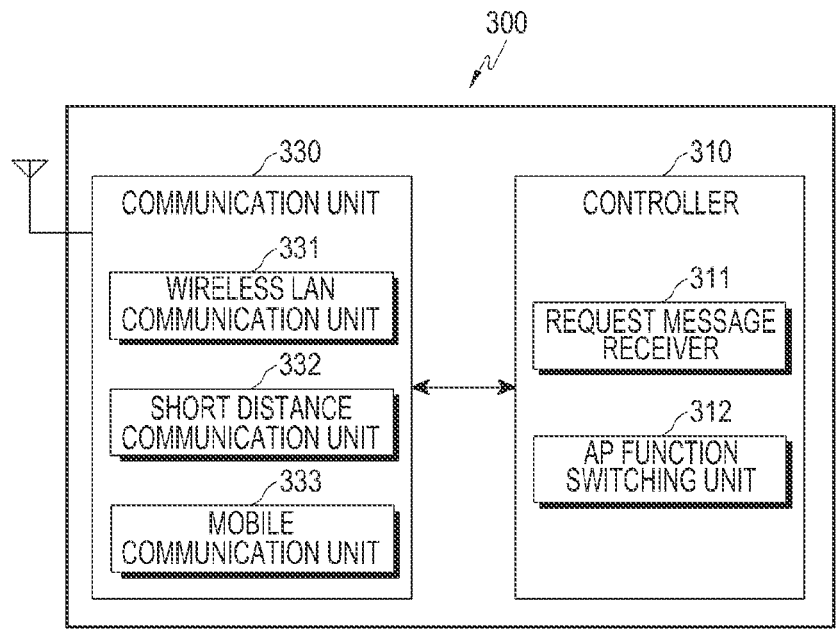
FIGS. 4A and 4B are block diagrams illustrating detailed structures of an AP device according to an embodiment of the present disclosure.
Figure 4B:
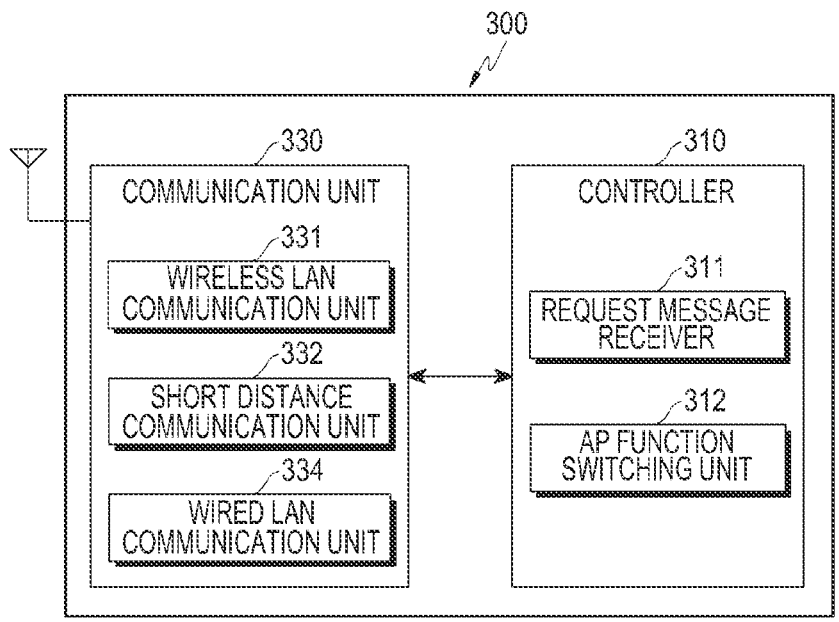

FIGS. 4A and 4B are block diagrams illustrating a detailed structure of the AP device according to embodiments of the present disclosure. FIG. 4A shows a configuration in which the AP device is connected to a wireless network to provide the AP function (for example, a configuration in which the first communication network 400 of FIG. 1 is a mobile communication network), and FIG. 4B shows a configuration in which the AP device is connected to a wired network to provide the AP function (for example, a configuration in which the first communication network 400 of FIG. 1 is a wired LAN).

Referring to FIG. 4A, the AP device 300 according to the embodiment of the present disclosure includes a controller 310 and a communication unit 330.

The controller 310 includes a request message receiver 311 and an AP function switching unit 312.

The request message receiver 311 determines whether the deactivation request message or the activation request message is received from the wirelessly connected user device 100 through the communication unit 330 (for example, a short distance communication unit 332 of the communication unit 330). As a result of the determination, when the request message receiver 311 receives the deactivation request message or the activation request message, the request message receiver 311 transmits a determination result to the AP function switching unit 312.

When the AP function switching unit 312 receives the activation request message from the request message receiver 311, the AP function switching unit 312 controls the deactivated AP function of the AP device 300 to be activated according to use intention information included in the activation request message.

In addition, when the AP function switching unit 312 receives the deactivation request message from the request message receiver 311, the AP function switching unit 312 controls the activated AP function of the AP device 300 to be deactivated according to non-use intention information included in the deactivation request message.

Further, when the received deactivation request message includes power reduction information instructing one or more operations for reducing power related to the AP function of the AP device 300, the AP function switching unit 312 performs a control such that the one or more operations for reducing the power related to the AP function are executed according to the power reduction information.

When there are a plurality of user devices which are wirelessly connected through the communication unit 330 and using the AP function service, and the AP function switching unit 312 receives deactivation request messages from all of the plurality of user devices, the AP function switching unit 312 performs a control such that the activated AP function of the AP device 300 is deactivated.

When the deactivation request message received from at least one of the plurality of user devices includes power reduction information instructing one or more operations for reducing power related to the AP function of the AP device 300, the AP function switching unit 312 performs a control such that the one or more operations for reducing the power related to the AP function are executed according to the power reduction information.

According to another embodiment of the present disclosure, the AP function switching unit 312 performs a control such that the one or more operations for reducing power related to the AP function are executed according to the power reduction information pre-stored in a storage unit (not shown) included in the AP device 300.

In the embodiment of FIG. 4A, the communication unit 330 includes a wireless Local Area Network (LAN) communication unit 331, a short distance communication unit 332, and a mobile communication unit 333.

When the AP function is activated according to a control of the controller 310, the wireless LAN communication unit 331 may service the AP function to the user device 100. The wireless LAN module 331 supports a wireless LAN standard (IEEE802.11x) of the Institute of Electrical and Electronics Engineers (IEEE). For example, the wireless LAN communication unit 331 supports WLAN, Wibro, Wimax, HSDPA, GSM, CDMA, WCDMA, LTE and the like, but is not limited thereto. The short distance communication unit 332 may receive an activation message or a deactivation message from the user device 100 which is wirelessly connected according to a control of the controller 310. Short distance communication schemes of the short distance communication unit 332 may include Bluetooth, BLE 4.x, Zigbee, UWB, PSC, RFID, IrDA, Wi-Fi Direct communication, NFC, and visible light communication, however, the embodiments of the present disclosure are not limited thereto.

When the AP function is activated according to a control of the controller 310, the mobile communication unit 333 provides a wireless Internet access to the corresponding user device 100 through a mobile communication network (for example, the first communication network 400 of FIG. 1). For example, the mobile communication unit 333 may service the AP function to the user device 100 through the mobile communication network such as Wibro, Wimax, HSDPA, GSM, CDMA, WCDMA, LTE and the like.

Referring to FIG. 4B, the AP device 300 according to another embodiment of the present disclosure includes the controller 310 and the communication unit 330. The AP device 300 described with reference to FIG. 4B includes a wired LAN communication unit 334 instead of the mobile communication unit 333 of the AP device 300 described with reference to FIG. 4A. Accordingly, detailed descriptions of the same components as those of the AP device 300 of FIG. 4A will be omitted and a function of the wired LAN communication unit 334 will be described here in detail.

When the AP function is activated according to a control of the controller 310, the wired LAN communication unit 334 provides the AP function to the user device 100 through a wired network (for example, the first communication network 400 of FIG. 1). For example, when the AP function is activated according to a control of the controller 310, the wireless LAN communication unit 334 accesses an external electronic device or server to service the AP function to the user device 100. The wired LAN communication unit 334 may support a wired LAN standard (IEEE 802), but is not limited thereto.

The system and the apparatus according to the embodiment of the present disclosure have been described above with reference to FIGS. 1 to 4. A process according to an embodiment of the present disclosure will now be described in detail with reference to FIGS. 5 to 10.

Figure 5:
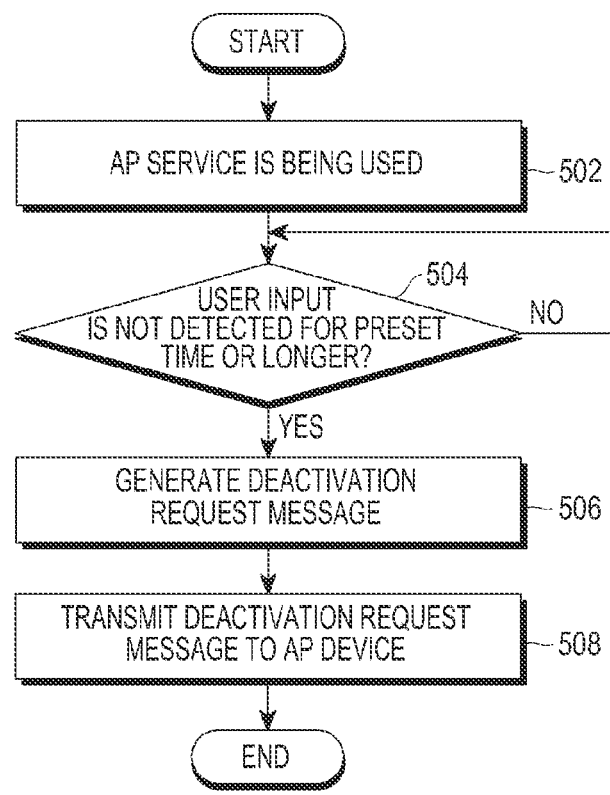
FIG. 5 is a flowchart illustrating a process in which a user device deactivates an AP function of an AP device according to an embodiment of the present disclosure.

FIG. 5 is a flowchart illustrating a process of deactivating the AP function of the AP device according to a message transmitted from the user device according to an embodiment of the present disclosure.

Referring to FIG. 5, when the user device according to an embodiment of the present disclosure uses the AP service through the activated AP function of the AP device in step 502, is determined whether a user input has not been detected for a preset time or longer in step 504. As a result of the determination, when the user input has not been detected for the preset time in step 504, step 506 may be performed.

In contrast, when the user input has been detected within the preset time, the user device continues to determine whether the user input is not detected for the preset time in step 504.

When the user input has not been detected for the preset time in step 504, the user device generates a deactivation request message including non-use intention information expressing a user's intention not to use the AP function of the AP device in step 506.

According to another embodiment of the present disclosure, the user device may further include power reduction information instructing one or more operations for reducing power related to the AP function of the AP device to further perform a process of generating the deactivation request message.

The user device transmits the generated deactivation request message to the AP device in step 508. As described above, the wireless communication scheme used when the user device uses the AP service provided by the activated AP function of the AP device and the wireless communication scheme used when the user device transmits the deactivation request message may be the same as or different from each other.

For example, the user device using the AP service through the wireless LAN communication may transmit the deactivation request message to the AP device through the wireless LAN communication. In another example, the user device may transmit the deactivation request message to the AP device through a wireless short distance communication scheme (for example, Bluetooth communication scheme) which is different from the wireless LAN communication while the user device uses the AP service through the wireless LAN communication.

Figure 6:
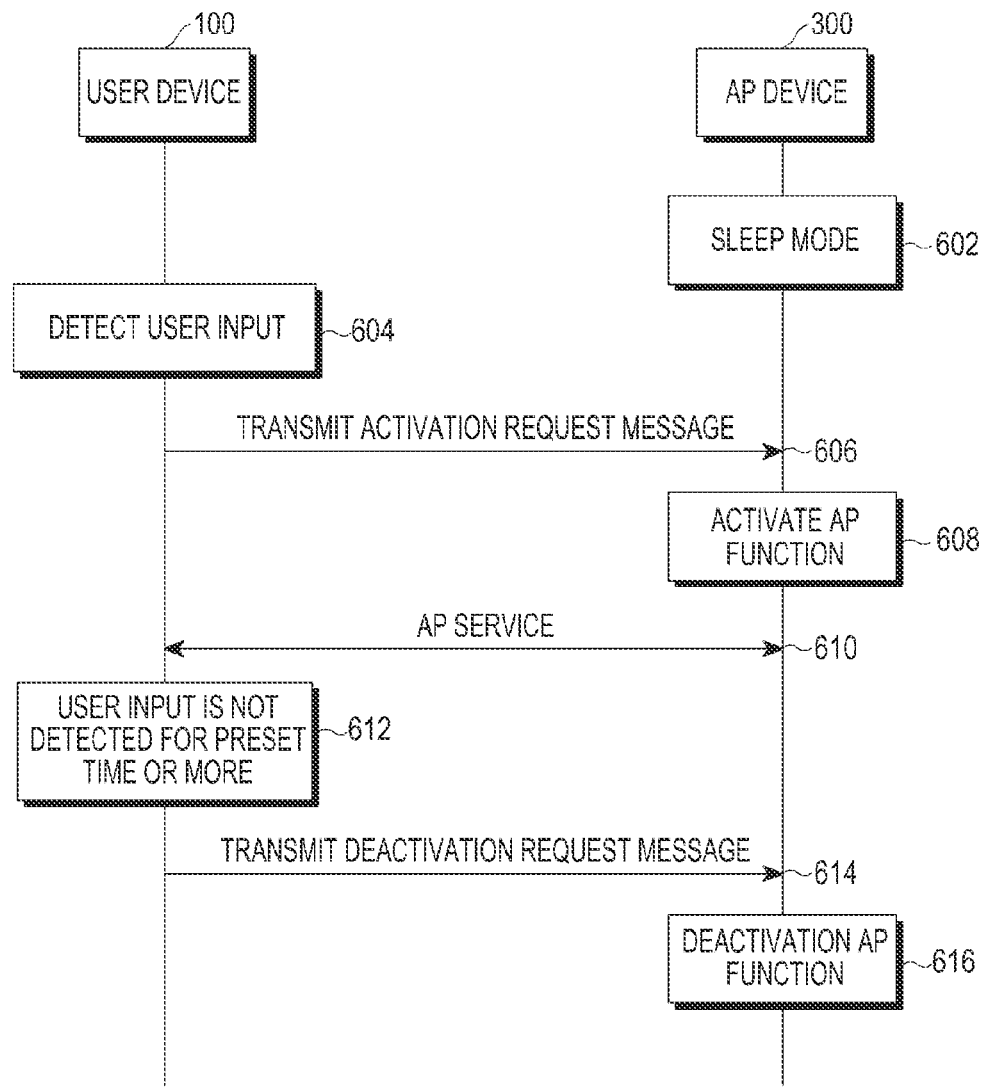
FIG. 6 is a signal flow diagram illustrating a process of message transmission between a user device and an AP device according to an embodiment of the present disclosure.

FIG. 6 is a signal flow diagram illustrating a process of message transmission between the user device and the AP device according to an embodiment of the present disclosure.

Referring to FIG. 6, the user device 100 and the AP device 300 according to an embodiment of the present disclosure may be connected to each other through wireless communication (for example, wireless short distance communication).

When each of the user device 100 and the AP device 300 supports a low power wireless short distance communication scheme, the user device 100 and the AP device 300 are wirelessly connected preferably through the low power wireless short distance communication rather than other wireless short distance communication schemes in order to reduce power consumption. For example, the user device 100 and the AP device 300 may be wirelessly connected to each other through the BLE scheme.

Meanwhile, as illustrated in FIG. 5, when the AP device 300 receives the deactivation request message from the user device 100 according to an embodiment of the present disclosure, the AP function of the AP device 300 is deactivated. For the sake of convenience, in FIG. 6, a deactivation state of the AP function is referred to as a sleep mode as indicated by reference numeral 602.

In a state where the AP device 300 is in the sleep mode, the user device 100 determines whether a user input is detected during a random state operation as indicated by reference numeral 604. As a result of the determination, when the user input is detected, the user device generates an activation request message including use intention information expressing a user's intention to use the AP function of the AP device 300. The user device 100 transmits the generated activation request message to the AP device 300 through the wireless communication (for example, wireless short distance communication) as indicated by reference numeral 606.

The AP device 300 activates the AP function according to the use intention information included in the activation request message received from the user device 100 as indicated by reference numeral 608. The AP device 300 provides the AP service to the user device 100 by the activated AP function as indicated by reference numeral 610.

Further, the user device 100 determines whether a user input has not been detected for a preset time or longer while the AP service of the AP device 300 is provided as indicated by reference numeral 612. When the user input has not been detected, the user device 100 generates the deactivation request message including non-use intention information expressing a user's intention not to use the AP function of the AP device 300.

Further, according to the present disclosure, the user device 100 may further include power reduction information instructing one or more operations for reducing power related to the AP function of the AP device 300 to generate the deactivation request message. The user device 100 transmits the generated deactivation request message to the AP device 300 through the wireless short distance communication or the wireless short distance communication scheme used for the AP function as indicated by reference numeral 614. The wireless short distance communication and the wireless short distance communication scheme used for the AP function may be the same as or different from each other.

The AP device 300 deactivates the AP function according to the deactivation request message received from the user device 100 as indicated by a reference numeral 616. Further, the AP device 300 may perform one or more operations for reducing power related to the AP function according to the power reduction information. The power reduction information may be information inserted into the deactivation request message and then received or information pre-stored in the storage unit of the AP device 300.

Figure 7:
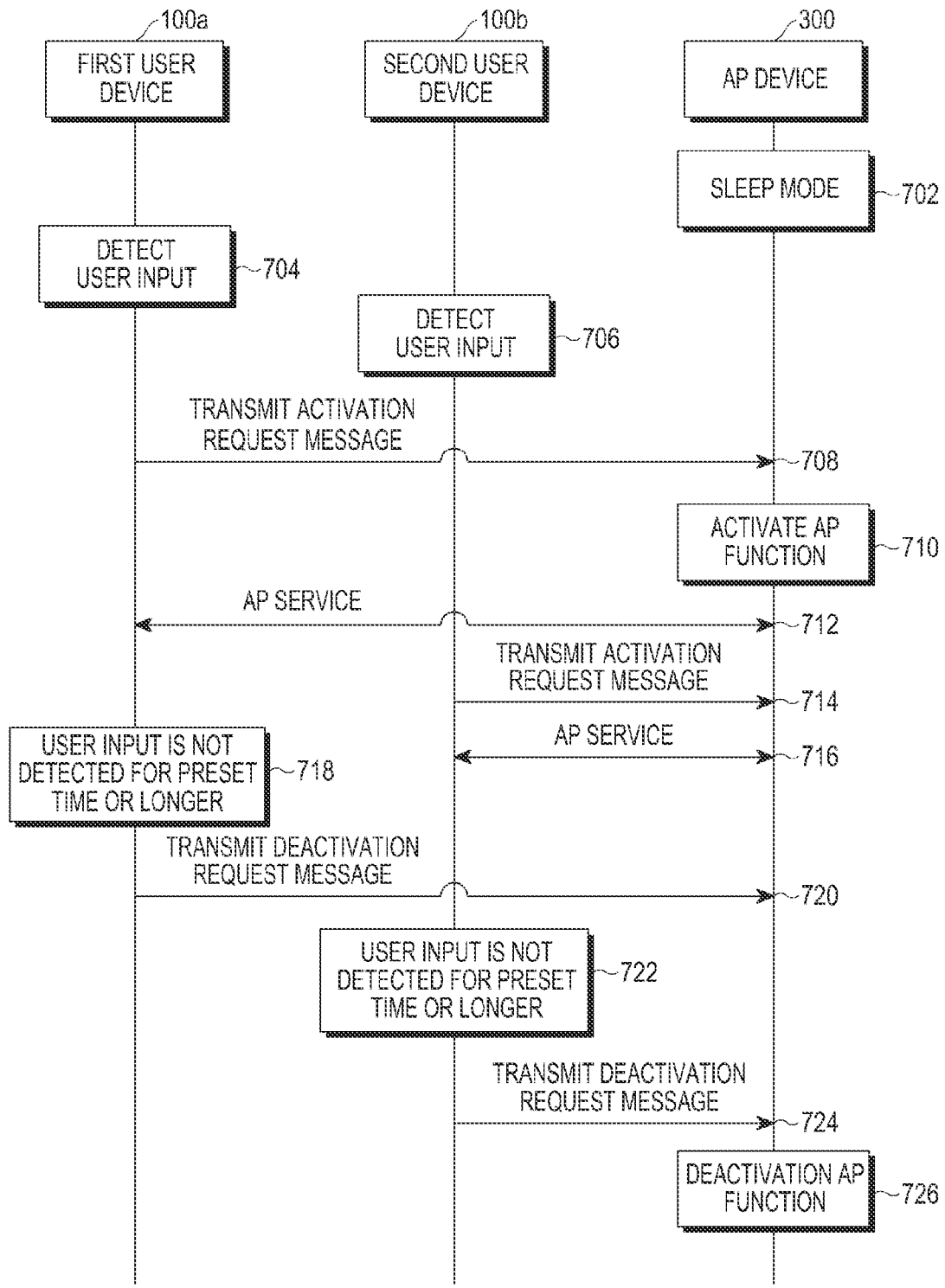
FIG. 7 is a signal flow diagram illustrating a process of message transmission between a plurality of user devices and an AP device according to an embodiment of the present disclosure.

FIG. 7 is a signal flow diagram illustrating a process of message transmission between a plurality of user devices and the AP device according to another embodiment of the present disclosure. Although a first user device 100a and a second user device 100b are illustrated in FIG. 7 as an example of the plurality of user devices for the sake of description, embodiments of the present disclosure may be applied to three or more user devices.

Referring to FIG. 7, the first user device 100a and the second user device 100b according to another embodiment of the present disclosure are connected to the AP device 300 through wireless communication (for example, wireless short distance communication). The wireless short distance communication schemes include the low power wireless short distance communication scheme such as BLE to reduce power consumed by respective devices included in the AP network.

Meanwhile, as illustrated in FIG. 5, when the AP device 300 receives the deactivation request message from the user device 100 according to an embodiment of the present disclosure, the AP function of the AP device 300 is deactivated. In FIG. 7, the deactivation state of the AP function is referred to as a sleep mode 702, as in FIG. 6.

In a state where the AP device 300 is in the sleep mode, the first user device 100a determines whether a user input is detected during a random state operation as indicated by reference numeral 704. As a result of the determination, when the user input is detected, the first user device 100a generates an activation request message including use intention information expressing the first user's intention to use the AP function of the AP device 300. The first user device 100a transmits the generated activation request message to the AP device 300 through the wireless communication (for example, wireless short distance communication) as indicated by reference numeral 708.

The AP device 300 activates the AP function according to the use intention information included in the activation request message received from the first user device 100a as indicated by reference numeral 710. The AP device 300 provides the AP service to the first user device 100a by the activated AP function as indicated by reference numeral 712.

Similarly, the second user device 100b determines whether a user input is detected during a random state operation as indicated by reference numeral 706. As a result of the determination, when the user input is detected, the second user device 100b generates an activation request message including use intention information expressing the second user's intention to use the AP function of the AP device 300. The second user device 100b transmits the generated activation request message to the AP device 300 through the wireless communication (for example, wireless short distance communication) as indicated by reference numeral 714.

The AP device 300 determines an intention of the second user device 100b to use the AP service of the AP function according to the use intention information included in the activation request message received from the second user device 100b. The AP device 300 activates the AP function according to the use intention information included in the activation request message received from the second user device 100*b*. However, the AP function of the AP device 300 is already in the activation state according to the use intention information included in the activation request message received from the first user device 100*a*. Accordingly, the AP device 300 provides the AP service to the second user device 100*b* by the already activated AP function as indicated by reference numeral 716.

Meanwhile, according to the present disclosure, the first user device 100*a* determines whether a user input has not been detected for a preset time as indicated by reference numeral 718. When the user input has not been detected for the preset time or longer, the first user device 100*a* generates a deactivation request message including non-use intention information expressing the first user's intention not to use the AP function of the AP device 300.

According to the present disclosure, the first user device 100*a* may further include power reduction information instructing one or more operations for reducing power related to the AP function of the AP device 300 to generate the deactivation request message. The first user device 100*a* transmits the generated deactivation request message to the AP device 300 through the wireless short distance communication or the wireless short distance communication scheme used for the AP function as indicated by reference numeral 720. The wireless short distance communication and the wireless short distance communication scheme used for the AP function may be the same as or different from each other.

Before the AP device 300 deactivates the AP function according to the deactivation request message received from the first user device 100*a*, if there is another user device (for example, second user device 100*b*) which is using the AP service provided by the activated AP function other than the first user device 100*a*, the AP device 300 postpones the operation of deactivating the AP function in the activation state.

Similarly, the second user device 100*b* determines whether a user input is detected for a preset time or longer as indicated by a reference numeral 722. When the user input has not been detected for the preset time or longer, the second user device 100*b* generates a deactivation request message including non-use intention information expressing the second user's intention not to use the AP function of the AP device 300.

According to the present disclosure, the second user device 100*b* may further include power reduction information instructing one or more operations for reducing power related to the AP function of the AP device 300 to generate the deactivation request message. The second user device 100*b* transmits the generated deactivation request message to the AP device 300 through the wireless short distance communication or the wireless short distance communication used for the AP function as indicated by a reference numeral 724.

The AP device 300 deactivates the AP function according to the deactivation request message received from the second user device 100*b* as indicated by a reference numeral 726. At this time, since the AP device 300 has received the deactivation request message from all of the plurality of user devices 100*a* and 100*b* which are using the AP service provided by the activated AP function of the AP device 300, the AP device 300 deactivates the AP function.

Further, the AP device 300 may perform one or more operations for reducing power related to the AP function according to the power reduction information. The power reduction information may be information included in the deactivation request message received from at least one of the first user device 100*a* and the second user device 100*b* or information pre-stored in the storage unit of the AP device 300.

It has been described with reference to FIG. 7 that the AP device 300 deactivates the AP function in the activation state when the AP device 300 described with reference to FIG. 7 receives the deactivation request message from all of the plurality of user devices 100*a* and 100*b* which are using the AP service provided by the activated AP function. However, the present disclosure is not limited thereto, and the AP device 300 may deactivate the AP function in the activation state when the AP device 300 receives the deactivation request message from at least one of the plurality of user devices 100*a* and 100*b* which are using the AP service, according to another embodiment of the present disclosure.

Figure 8:
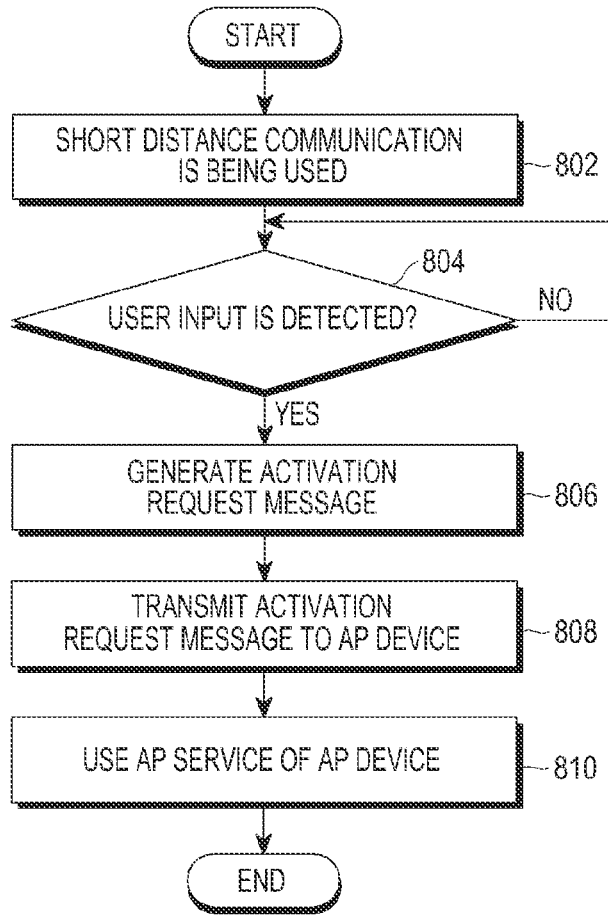
FIG. 8 is a flowchart illustrating a process in which a user device activates an AP function of an AP device according to an embodiment of the present disclosure.

FIG. 8 is a flowchart illustrating a process in which the user device according to an embodiment of the present disclosure activates the AP function of the AP device.

Referring to FIG. 8, the user device according to the embodiment of the present disclosure is communicating with the AP device through wireless short distance communication in step 802, and determines whether a user input is detected during a random state operation in step 804. As a result of the determination, when the user input is detected, the user device performs step 806. When the user input is not detected in a random state operation, the user device remains in standby until the user input is detected during the random state operation.

When the user input is detected by the user device, the user device generates the activation request message including use intention information expressing a user's intention to use the AP service of the AP device in step 806.

The user device transmits the generated activation request message to the AP device through the wireless short distance communication in step 808.

When the AP function of the AP device is activated, the user device is connected to the AP device to use the AP service provided by the activated AP function of the AP device in step 810.

Figure 9:
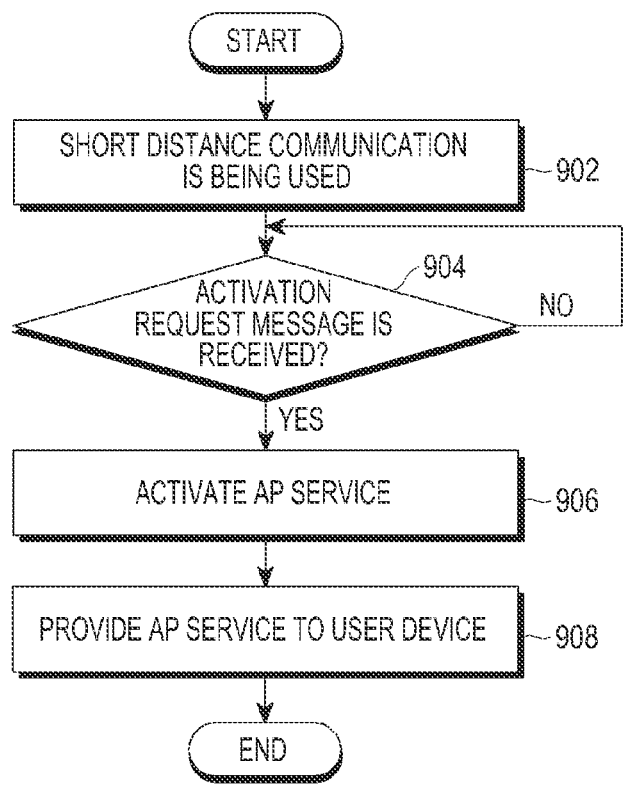
FIG. 9 is a flowchart illustrating a process in which an AP device activates an AP function by an activation request message received from a user device according to an embodiment of the present disclosure.

FIG. 9 is a flowchart illustrating a process in which the AP device activates the AP function by the activation request message received from the user device according to an embodiment of the present disclosure.

Referring to FIG. 9, the user device according to the embodiment of the present disclosure is communicating with the AP device through wireless short distance communication in step 902 and the AP device determines whether the activation request message is received from the user device in step 904. As a result of the determination, when the activation request message is received, the AP device performs step 906. When the activation request message is not received, the AP device remains in standby until the activation request message is received from the user device.

When the AP device receives the activation request message from the user device, the AP device activates the AP function according to use intention information included in the activation request message in step 906.

When the AP function is activated in the AP device, the AP device provides the AP service to the corresponding user device having transmitted the activation request message in step 908. The AP device may receive the activation request message from the user device through the wireless short distance communication. As described above, the short distance communication includes low power short distance communication. Further, the AP service of the AP device may be provided to the user device through the wireless short distance communication or another wireless short distance communication different from the wireless short distance communication. For example, the AP device may provide the AP service to the user device through Wi-Fi and receive the activation request message through BLE.

Figure 10:
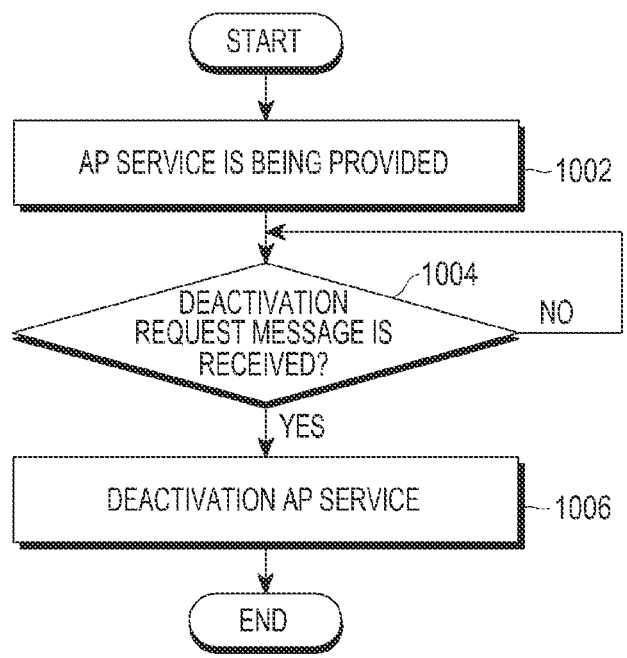
FIG. 10 is a flowchart illustrating a process in which an AP device deactivates an AP function by a deactivation request message received from a user device according to an embodiment of the present disclosure.

FIG. 10 is a flowchart illustrating a process in which the AP device deactivates the AP function by the deactivation request message received from the user device according to an embodiment of the present disclosure.

Referring to FIG. 10, the AP device according to the embodiment of the present disclosure determines whether the deactivation request message is received from the user device in step 1004 in a state where the AP device provides the AP service to the user device in step 1002. As a result of the determination, when the deactivation request message is received, the AP device performs step 1006. When the deactivation request message is not received, the AP device remains in standby until the deactivation request message is received from the user device.

When the AP device receives the deactivation request message from the user device, the AP device deactivates the AP function according to non-use intention information included in the deactivation request message in step 1006.

Further, when power reduction information is included in the deactivation request message received from the user device according to another embodiment of the present disclosure, the AP device may further execute a process of performing one or more operations for reducing power related to the AP function according to the power reduction information.

In addition, when the power reduction information is not included in the deactivation request message received from the user device, the AP device may further execute a process of perform one or more operations for reducing power related to the AP function according to the power reduction information stored in a storage unit included in the AP device.

Meanwhile, a representative configuration of the electronic device (AP device and/or user device) according to an embodiment of the present disclosure may correspond to a configuration of the portable device (for example, mobile phone, smart phone or the like), and some components may be omitted or changed from the representative configuration of the electronic device as necessary. First, the configuration of the portable device will be first described with reference to FIG. 11 as one example of the electronic device applied to the present disclosure.

Figure 11:
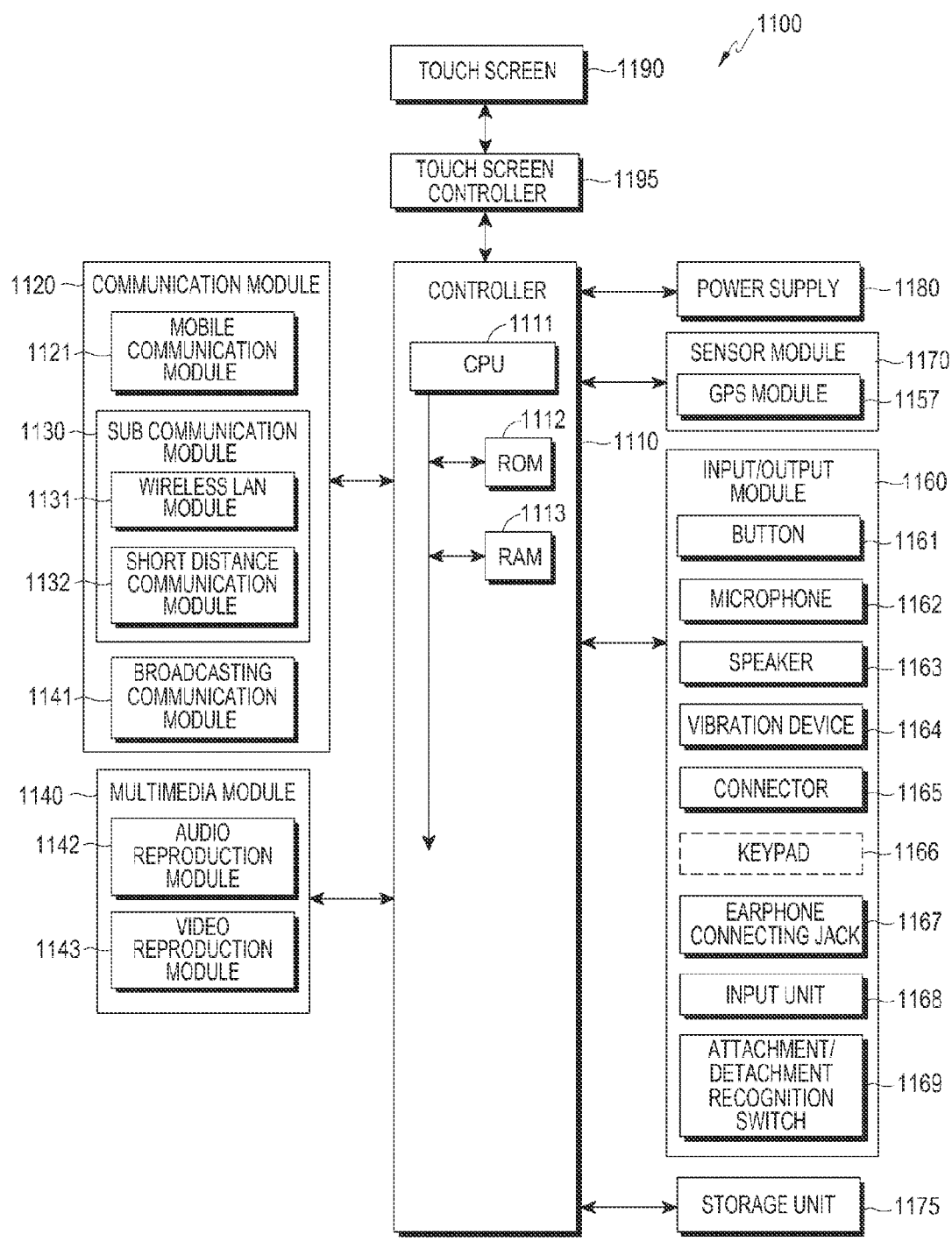
FIG. 11 is a block diagram illustrating a detailed structure of a user device as an example of the user device or an AP device according to an embodiment of the present disclosure.

FIG. 11 is a block diagram illustrating a detailed structure of the user device as an example of the user device or the AP device according to an embodiment of the present disclosure.

Referring to FIG. 11, a user device 1100 may be connected to an external electronic device by using at least one of a communication module 1120, a connector 1165, and an earphone connecting jack 1167. The "external electronic device" may include various devices attached to or detached from the user device 1100 through a wire, such as an earphone, an external speaker, a Universal Serial Bus (USB) memory, a charger, a cradle/dock, a DMB (Digital multimedia Broadcasting) antenna, a mobile payment related device, a health management device (for example, blood sugar tester or the like), a game machine, a car navigation device, an input device, and the like. Further, the external electronic device may include a Bluetooth communication device, an NFC device, a Wi-Fi Direct communication device, a wireless AP, and the like which can be wirelessly connected.

In addition, the user device 1100 may be connected with another user device or another electronic device, for example, a mobile phone, a smart phone, a tablet PC, a desktop PC, and a server. The user device 1100 may be connected to the input device by using at least one of the communication module 1120, the connector 1165, and the earphone connecting jack 1167.

The user device 1100 includes at least one touch screen 1190 and at least one touch screen controller 1195, as well as a controller 1110, the communication module 1120, a multimedia module 1140, an input/output module 1160, a sensor module 1170, a storage unit 1175, and a power supply 1180. The communication module 1120 includes a mobile communication module 1121, a sub communication module 1130, and a broadcasting communication module 1141. The sub communication module 1130 includes at least one of a wireless LAN module 1131 and a short distance communication module 1132. The multimedia module 1140 includes at least one of an audio reproduction module 1142 and a video reproduction module 1143. The input/output module 1160 includes at least one of a button 1161, a microphone 1162, a speaker 1163, a vibration device 1164, a connector 1165, and a keypad 1166, the earphone connecting jack 167, an input unit 168, and an attachment/detachment recognition switch 1175.

The controller 1110 includes a Central Processing Unit (CPU) 1111, a Read Only Memory (ROM) 1112 storing a control program for controlling the user device 1100, and a Random Access Memory (RAM) 1113 used as a storage area for storing a signal or data input from the outside of the user device 1100 or for work performed in the user device 1100. The CPU 1111 may include a single core, a dual core, a triple core, or a quadruple core. The CPU 1111, the ROM 1112, and the RAM 1113 may be mutually connected to each other through an internal bus. Further, the RAM 1113 may store at least one of the activation request message, the deactivation request message, the user use intention information, the user non-use intention information, and the power reduction information generated by the controller 1110.

The controller 1110 controls the communication module 1120, the multimedia module 1140, the input/output module 1160, the sensor module 1170, the storage unit 1175, the power supply 1180, the touch screen 1190, and the touch screen controller 1195.

In order to use the AP service provided by the activated AP function of the AP device according to an embodiment of the present disclosure, the controller 1110 controls the user device 1110 to be wirelessly connected with the AP device through wireless short distance communication provided by the communication module 1120. The controller 1110 determines whether a user input has not been detected for a preset time or longer through the input module of the input/output module 1160 or the touch screen 1190.

The controller 1110 may also determine whether a user input has not been detected for a preset time or longer through an input device of external electronic device connected to the user device 1100. As a result of the determination, when the user input has not been detected for the preset time, the controller 1110 generates the deactivation request message including non-use intention information informing of an intention of the user device 1110 not to use the AP service of the AP device having the activated AP function. The controller 1110 performs a control such that the generated deactivation request message is transmitted to the AP device through the wireless short distance communication provided by the communication module 1120. The preset time may be stored in advance in the storage unit included in the user device by a user or a manufacturer of the user device.

Further, the controller 1110 may further include power reduction information instructing at least one operation for reducing power related to the AP function of the AP device to generate the deactivation request message. The wireless short distance communication may be wireless short distance communication used for the AP service or other wireless short distance communication used for a wireless connection with the AP device before the AP service is used.

The controller 1110 controls the user device 1100 to be wirelessly connected with the AP device having the deactivated AP function through the wireless short distance communication provided by the communication module 1120 before the AP service is used according to an embodiment of the present disclosure. The controller 1100 determines whether a user input is detected by the user device 1100 which is operating in a random state. The controller 1110 determines whether the user input is detected through the input module of the input/output module 1160 or the touch screen 1190. The controller 1110 may also determine whether a user input is detected through an input device of external electronic device connected with the user device 1100. As a result of the determination, when the user input is detected, the controller 1110 generates the activation request message including use intention information informing of an intention of the user device 1100 to use the AP service of the AP device having the activated AP function. The controller 1110 performs a control such that the generated activation request message is transmitted to the AP device through the wireless short distance communication provided by the communication module 1120. The random state includes at least one of a power sleep state, a standby state, an idle state, and a deep idle state. As described above, the wireless short distance communication used for the wireless connection with the AP device before the AP service is used and the wireless short distance communication to be used for the AP service may be the same as or different from each other. For example, the controller 1110 may control the communication module 1120 to be wirelessly connected with the AP device through low power wireless short distance communication. Detailed functions of the controller 1110 according to an embodiment of the present disclosure have been described above with regards to FIG. 3.

The user input into the user device 1100 according to an embodiment of the present disclosure may include a gesture input through a camera module (not shown), a switch/button input through the button 1161 or the keypad 1166, a voice input through the microphone 1162, and an input by an external input device connected with the user device 1100 wirelessly or through a wire as well as a user input through the touch screen 1190.

Further, the controller 1110 may detect a user input event such as a hovering event using the input unit 1168 as it approaches the touch screen 1190 or is located close to the touch screen 1190.

In addition, the controller 1110 may detect various user inputs received through the camera module), the input/output module 1160, and the sensor module 1170 as well as the touch screen 1190. The user input may include various types of information input into the user device 1100 such as a gesture, a voice, a pupil action, an iris recognition, and a bio signal of the user as well as the touch. The controller 1110 may control a predetermined operation or function corresponding to the detected user input to be performed within the user device 1100.

The controller 1110 may output a control signal to the input unit 1168 (for example, a stylus pen, an electronic pen or the like) or the vibration device 1164. The control signal may include information on a vibration pattern, and the input unit 1168 or the vibration device 1164 generates a vibration according to the vibration pattern. The information on the vibration pattern may indicate the vibration pattern itself or an indicator of the vibration pattern. Alternatively, the control signal may include only a request for generating the vibration.

The mobile communication module 1121 allows the user device 1100 to transmit/receive a wireless signal to/from another electronic device such as a base station, an external user device, or a server through a mobile communication network such as GSM, CDMA, WCDMA, LTE or the like by using at least one antenna according to a control of the controller 1110. The mobile communication module 1121 transmits/receives a wireless signal for a voice call, a video call, a Short Message Service (SMS) or a Multimedia Messaging Service (MMS) to/from a mobile phone, a smart phone, a tablet PC or another electronic device.

Further, the mobile communication module 1121 may activate the AP function in order to provide the AP service to another electronic device according to a control of the controller 1110. When the AP function is activated, a wireless Internet access may be provided through the mobile communication network.

The wireless LAN module 1131 wirelessly accesses the AP service provided by the AP device according to a control of the controller 1110 to be connected with the Internet network. The wireless LAN module 1131 supports a wireless LAN standard (IEEE802.11x) of the Institute of Electrical and Electronics Engineers (IEEE). Further, the wireless LAN module 1131 may support WLAN, Wibro, Wimax, HSDPA, GSM, CDMA, WCDMA, LTE and the like, but is not limited thereto.

According to an embodiment of the present disclosure, the wireless LAN module 1131 transmits the deactivation request message generated by the controller 1110 to the AP device during an access to the AP service according to a control of the controller 1110.

Further, the wireless LAN module 1131 may activate the AP function in order to provide the AP service to another electronic device based on a control of the controller 1110 according to an embodiment of the present disclosure. For example, the wireless LAN module 1131 may access the Internet network through the mobile communication network such as Wibro, HSDPA, GSM, CDMA, WCDMA, LTE or the like. The wireless LAN module 1131 provides the accessed Internet network through the AP service in another electronic device according to a control of the controller 1110.

The short distance communication module 1132 wirelessly performs short distance communication between the user device 1100 and another external electronic device according to a control of the controller 1110. A short distance communication technique may include Bluetooth, BLE 4.x, Zigbee, UWB, PSC, RFID, IrDA, Wi-Fi Direct communication, NFC, and visible light communication.

Further, the short distance communication module 1132 activates the AP function in order to provide the AP service to another electronic device based on a control of the controller 1110.

Further, the short distance communication module 1132 transmits the deactivation request message generated by the controller 1110 to the AP device according to a control of the controller 1110.

The broadcasting communication module 1141 receives a broadcasting signal (for example, a TV broadcasting signal, a radio broadcasting signal, or a data broadcasting signal) and broadcasting supplement information (for example, Electric Program Guide: EPG or Electric Service Guide: ESG) output from a broadcasting station through a broadcasting communication antenna according to a control of the controller 1110.

The multimedia module 1140 includes the audio reproduction module 1142 and the video reproduction module 1143. The audio reproduction module 1142 reproduces a digital audio file (for example, a file having a file extension of mp3, wma, ogg, or wav) stored or received according to a control of the controller 1110. The video reproduction module 1143 reproduces a digital video file (for example, a file having a file extension of mpeg, mpg, mp4, avi, mov, or mkv) stored or received according to a control of the controller 1110. The multimedia module 1140 may be integrated in the controller 1110.

The input/output module 1160 includes at least one of at least one button 1161, at least one microphone 1162, at least one speaker 1163, at least one vibration device 1164, the connector 165, the keypad 1166, the earphone connecting jack 1167, the input unit 1168, and the attachment/detachment recognition switch 1169. The input/output module 1160 is not limited thereto, and a mouse, a trackball, a joystick, or a cursor control such as cursor direction keys may be provided for controlling a motion of a cursor on the touch screen 1190.

The button 1161 may be formed on a front surface, a side surface, or a rear surface the housing (or case) of the user device 1100, and may include at least one of a power/lock button, a volume button, a menu button, a home button, a back button, and a search button.

The microphone 1162 receives a voice or a sound to generate an electrical signal according to a control of the controller 1110.

The speaker 1163 outputs sounds corresponding to various signals or data (for example, wireless data, broadcasting data, digital audio data, digital video data and the like) to the outside of the user device 1100 according to a control of the controller 1110. The speaker 1163 may also output a sound (for example, button tone corresponding to a phone call, ringing tone, and a voice of a counterpart user) corresponding to a function performed by the user device 1100. One or more speakers 1163 may be formed at a proper position or positions of the housing of the user device 1100. Further, when a function of the hardware button 1161 of the user device 1100 is executed according to a control of the controller 1110, the speaker 1163 may output a sound corresponding to the performed function.

The vibration device 1164 converts an electrical signal to a mechanical vibration according to a control of the controller 1110. For example, the user device 1100 in a vibration mode operates the vibration device 1164 when a voice or video call is received from another device. One or more vibration devices 1164 may be formed within the housing of the user device 1100. The vibration device 1164 may operate in accordance with a user input through the touch screen 1190. Further, when a function of the hardware button 1161 of the user device 1100 is executed according to a control of the controller 1110, the vibration device 1164 may output a mechanical vibration corresponding to the performed function. The vibration device 1164 may have different vibration intensity and vibration period according to each function of the button 1161.

The connector 1165 is an interface for connecting the user device 1100 with another external electronic device or a power source. The controller 1110 may transmit or receive data stored in the storage unit 1175 of the user device 1100 to or from an external electronic device through a wired cable connected to the connector 1165. The user device 1100 may receive power from the power source through the wired cable connected to the connector 1165 or charge a battery by using the power source. Further, the connector 1165 may be used as an interface for connecting the user device 1100 with a device including an input means. In addition, the connector 1165 may be used as an interface for connecting the user device 1100 with a mediation electronic device connected with a device including an input means.

The keypad 1166 receives a key input from the user so as to control the user device 1100. The keypad 1166 may include a physical keypad installed in the user device 1100 or a virtual keypad displayed on the touch screen 1190. Further, the keypad 1166 is an input device, and may be attached/detached to/from the user device 1100 or included within the housing of the user device. The physical keypad 1166 installed in the user device 1100 may be omitted according to a capability or structure of the user device 1100. An earphone may be inserted into the earphone connecting jack 1167 to be connected with the user device 1100.

The input unit 1168 may be inserted into the inside of the user device 1100 and withdrawn or separated from the user device 1100 when being used. An attachment/detachment recognition switch 1169 which works in accordance with an installation and attachment/detachment of the input unit 1168 is located at one area within the user device 1100 into which the input unit 1168 is inserted, and the attachment/detachment recognition switch 1169 outputs signals corresponding to the installation and separation of the input unit 1168 to the user device 1100. The attachment/detachment recognition switch 1169 may be configured to directly/indirectly contact the input unit 1168 when the input unit 168 is mounted. Accordingly, the attachment/detachment recognition switch 1169 generates the signal corresponding to the installation or the separation of the input unit 1168 (that is, a signal informing of the installation or the separation of the input unit 1168) and outputs the generated signal to the controller 1110 based on whether the attachment/detachment recognition switch 1169 contacts the input unit 1168.

The sensor module 1170 includes at least one sensor that detects a status of the user device 1100. For example, the sensor module 1170 includes at least one of a proximity sensor for detecting whether the user approaches the user device 1100, an illumination sensor for detecting an amount of ambient light of the user device 1100, a motion sensor for detecting a motion (for example, rotation, acceleration, or vibration of the user device 1100) of the user device 1100, a geo-magnetic sensor for detecting a point of the compass of the user device 1100 by using the Earth's magnetic field, a gravity sensor for detecting a gravity action direction, an altimeter for measuring an atmospheric pressure to detect an altitude, and a GPS module 1157. The GPS module 1157 receives radio waves from a plurality of GPS satellites in the Earth's orbit and calculates a position of the user device 1100 by using Time of Arrival from the GPS satellites to the user device 1100.

The storage unit 1175 stores signals input/output according to the operation of the communication module 1120, the input/output module 1160, the sensor module 1170, and the touch screen 1190 or input/output data of the user device 1100 according to a control of the controller 1110. The storage unit 1175 may store a control program and applications for controlling the user device 1100 or the controller 1110.

The term "storage unit" is used as a term which refers to the storage unit 1175, the ROM 1112 or the RAM 1113 within the controller 1110, or a random data storage device such as a memory card (for example, an SD card or a memory stick) installed in the user device 1100. The storage unit 1175 may include a non-volatile memory, a volatile memory, or a Hard Disk Drive (HDD) or a Solid State Drive (SSD).

Further, the storage unit 1175 may store images for providing applications having various functions such as a navigation, a video call, a game and an alarm application based on time and Graphical User Interfaces (GUIs) related to the applications, databases or data related to a method of processing user information, a document, and a touch input, background images (menu screen, standby screen and the like) required for driving the user device 1100, operating programs, or images photographed by a camera module.

The storage unit 1175 stores at least one of the deactivation request message, the activation request message, the use intension information, the non-user intention information, and the power reduction information.

The storage unit 1175 is a machine (for example, computer)-readable medium, and the term of the machine-readable medium may be defined as a medium for providing data to the machine to perform a specific function. The storage unit 1175 may include a non-volatile medium and a volatile medium. All of these media should be a type that allows the commands transferred by the media to be detected by a physical instrument in which the machine reads the commands into the physical instrument.

The machine-readable medium includes at least one of a floppy disk, a flexible disk, a hard disk, a magnetic tape, a Compact Disc Read-Only Memory (CD-ROM), an optical disk, a punch card, a paper tape, a Random Access Memory (RAM), a Programmable Read-Only Memory (PROM), an Erasable PROM (EPROM), a flash-EPROM, and an embedded Multi Media Card (eMMC), but is not limited thereto.

The power supply 1180 supplies power to one or more batteries arranged within the housing of the user device 1100 according to a control of the controller 1110. The one or more batteries supply power to the user device 1100. Further, the power supply 1180 may supply power input from an external power source through a wired cable connected to the connector 1165 to the user device 1100. In addition, the power supply 1180 may supply power wirelessly input from the external power source through a wireless charging technology to the user device 1100.

The user device 1100 includes at least one touch screen 1190 providing user graphical interfaces corresponding to various services (for example, a phone call, data transmission, broadcasting, and photography) to the user. The touch screen 1190 outputs an analog signal corresponding to at least one user input into the user graphical interface to the touch screen controller 1195.

The touch screen 1190 receives at least one user input through a user's body (for example, fingers) or the input unit 1168. The touch screen 1190 may be implemented in, for example, a resistive type, a capacitive type, an infrared type, an acoustic wave type, or a combination thereof.

Further, the touch screen 1190 may include one or more touch panels which can detect touches or approaches of the finger and the input unit 168 in order to receive inputs by the finger and the input unit 168, respectively. The one or more touch panels provide different output values to the touch screen controller 1195. Then, the touch screen controller 1195 may recognize the different values input to the one or more touch panels to distinguish whether the input from the touch screen 1190 is an input by the finger or an input by the input unit 1168.

In addition, the touch is not limited to a touch between the touch screen 1190 and the user's body or touchable input means, but may include a non-contact hover having an interval (for example, 1 mm or shorter) between the touch screen 1190 and the user's body or touchable input means. The detectable interval of the touch screen 1190 may be changed according to a capability or structure of the user device 1100.

The touch screen controller 1195 converts an analog signal received from the touch screen 1190 to a digital signal and transmits the converted digital signal to the controller 1110. The controller 1110 controls the touch screen 1190 by using the digital signal received from the touch screen controller 1195. The touch screen controller 1195 detects a hovering interval or distance as well as a position of the user input by detecting a value (for example, a current value or the like) output through the touch screen 1190, converts the detected distance value to a digital signal, and then provides the converted digital signal to the controller 1110. Further, the touch screen controller 1190 may detect a pressure applied to the touch screen 1190 by the user input means by detecting the value (for example, the current value or the like) output through the touch screen 190, convert the identified pressure value to a digital signal, and then provide the converted digital signal to the controller 110.

Figures 12A, 12B:
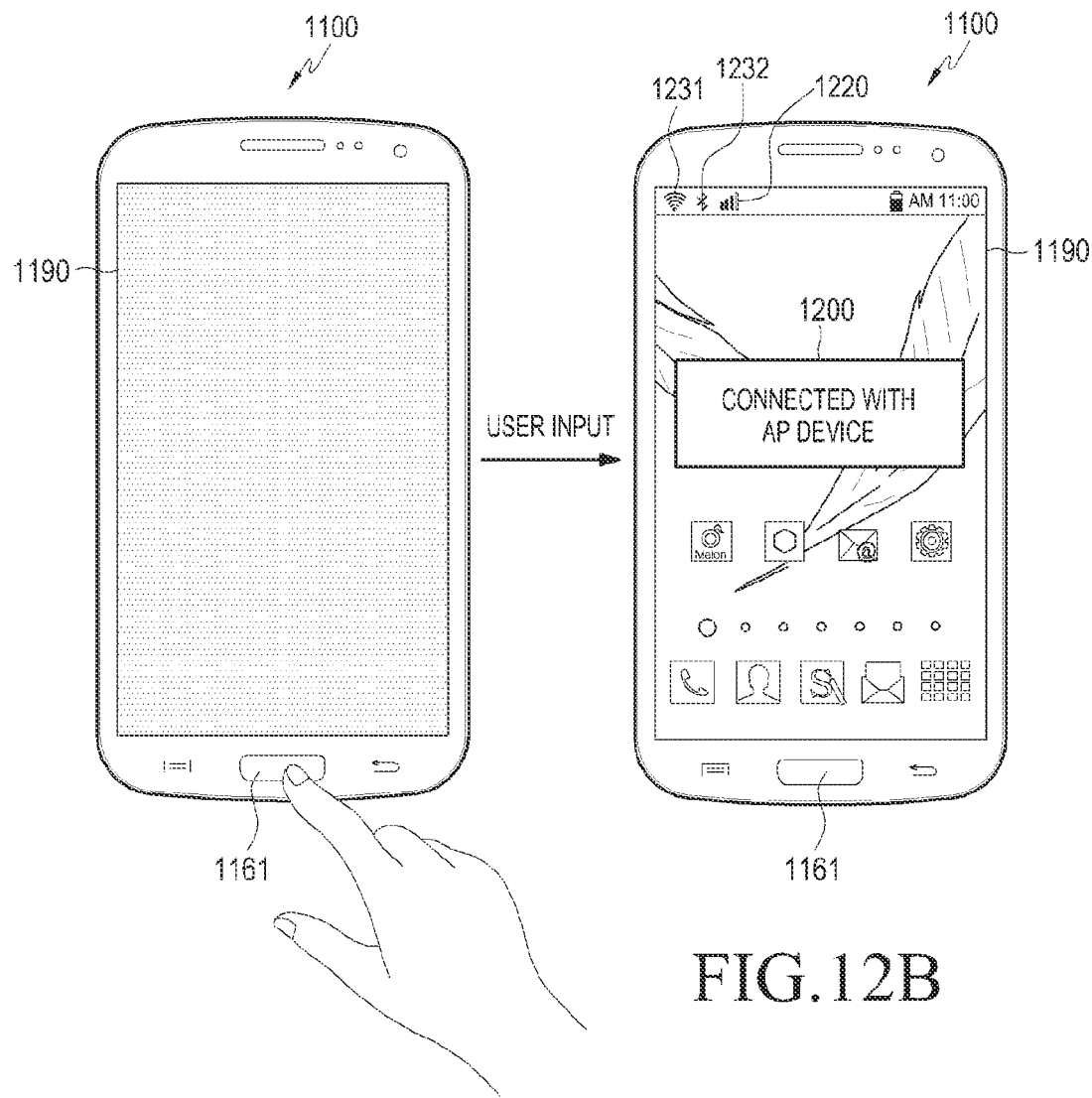
FIGS. 12A and 12B illustrate an example of a method in which a user device activates an AP function of an AP device according to an embodiment of the present disclosure.

FIGS. 12A and 12B illustrate an example of using a method in which the user device activates the AP function of the AP device according to an embodiment of the present disclosure.

Referring to FIG. 12A, the user device 1100 according to the embodiment of the present disclosure is in a state where the user device 1100 is connected with the AP device through wireless communication. The user device 1100 operates in a random state such as a standby state, a screen sleep state, or the like. When the user device 1100 illustrated in FIG. 12A operates in, for example, the power sleep state, a display unit (for example, the touch screen 1190) may be in a deactivation state. The user device 1100 of FIG. 12A displays a screen before a user input is input through an input unit (for example, the button 1161) displayed during a random state operation.

Referring to FIG. 12B, a status bar showing a state of the user device 1100 displays reception intensity 1220 of the mobile communication network, reception intensity 1231 of the wireless LAN communication (for example, Wi-Fi) network, and an activation state 1232 of the short distance communication network. When a user input is input through the button 1161 displayed during a random state operation, the user device 1100 generates the activation request message making a request for activating the AP function of the external AP device and transmits the generate activation request message to the external AP device according to an embodiment of the present disclosure as described above. When the AP device activates the AP function according to the activation request message, the AP device provides the AP service to the user device 1100 through the activated AP function.

Meanwhile, when the user device 1100 enters a state where the AP service of the AP device can be used, the user device 1100 may be wirelessly connected with the AP device and a possibility of the use of the AP service may be displayed on the touch screen 1190 in a text. For example, the possibility of the use of the AP service may be displayed in an AP service available text 1200 such as "Connected with the AP Device" in a popup manner.

Although it has been described in FIG. 12 that the possibility of the use of the AP service is displayed in the text in the user device 1100, the present disclosure is not limited thereto and the possibility of the use of the AP service may be displayed by a sound output, a vibration output, or an indicator output.

Figures 13A, 13B, 13C:
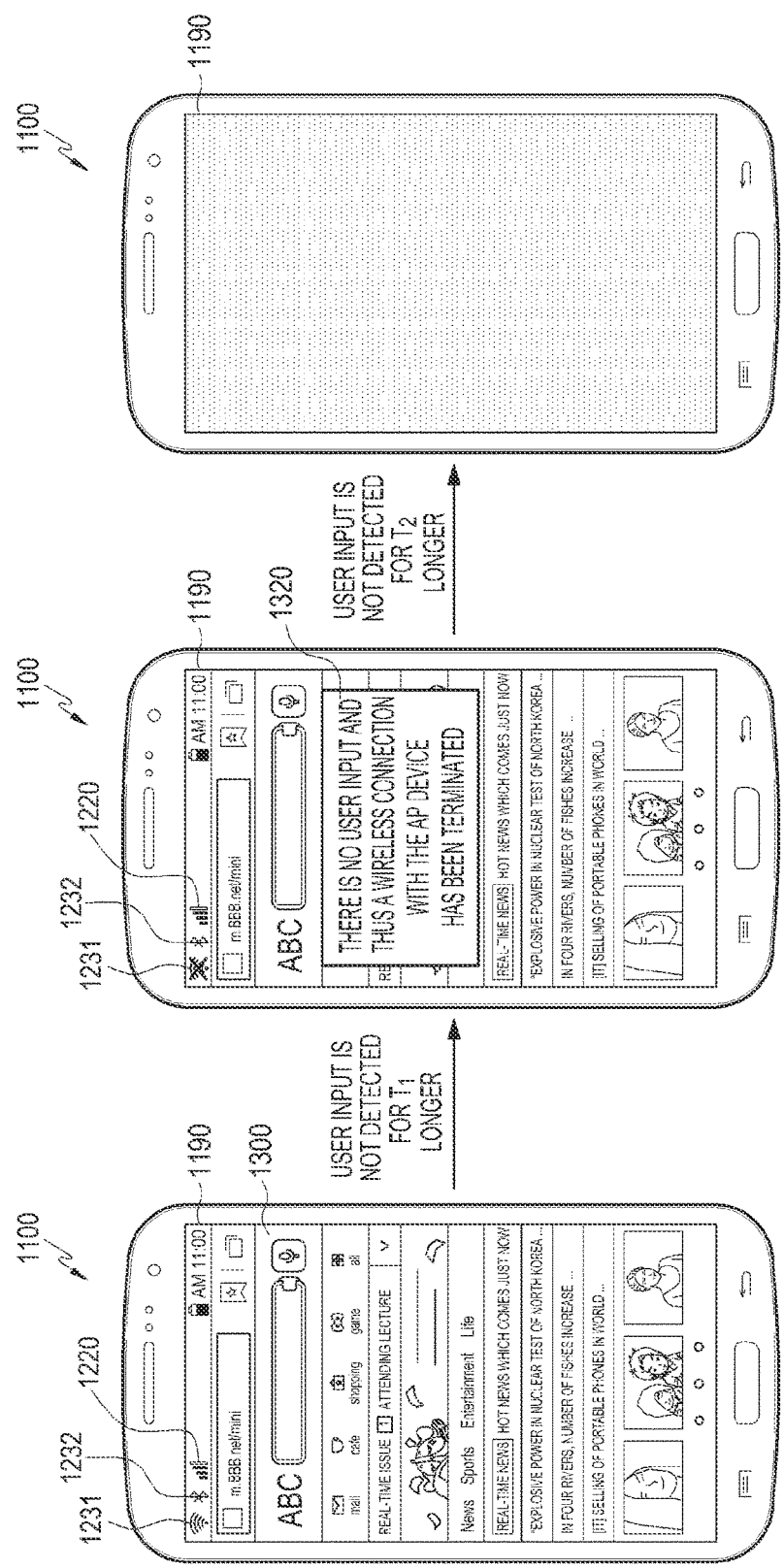
FIGS. 13A to 13C illustrate an example of a method in which a user device deactivates an AP function of an AP device according to an embodiment of the present disclosure.

FIGS. 13A to 13C illustrate an example of a method in which the user device deactivates the AP function of the AP device according to an embodiment of the present disclosure.

Referring to FIG. 13A, a screen of an Internet browser 1300 provided using the AP service of the AP device may be displayed on a display unit (for example, the touch screen 1190) of the user device 1100 according to an embodiment of the present disclosure.

Referring to FIG. 13B, since the user input has not been input through the input unit included in the user device 1100 for at least a preset time T1, a termination of the wireless connection with the AP service of the AP device may be displayed on the touch screen 1190 by an AP service use termination text 1320 such as "There Is No User Input And Thus A Wireless Connection With The AP Device Has Been Terminated".

FIG. 13C illustrates the user device 1100 operating in a random state such as a standby state, a screen sleep state or the like since a user input has not been input through the input unit included in the user device 1110 for a preset time T2 or longer.

In an embodiment of the present disclosure, the user device 100 or 1100 may further include at least one processor and at least one memory having a computer program code within a circuit.

Various embodiments of the present disclosure may be implemented through at least one software program which is executed on at least one hardware device and performs a network management function to control elements. The elements illustrated in FIGS. 3, 4, and 11 include a block which may be a hardware device or a combination of the hardware device and a software module.

The descriptions of the above mentioned particular embodiments include general characteristics of embodiments of the present disclosure to the extent that they may be easily changed and/or modified for various applications without departing from the general idea through the application of current knowledge by other people, and accordingly, the changes and modifications should be included within meanings and the scope of the equivalents of the disclosed embodiments. It is noted that the expressions and terms used in the specification are only for the description and do not limit the present disclosure. Therefore, although the embodiments of the present disclosure have been described with reference to particular embodiments, it will be recognized by those skilled in the art that the embodiments of the present disclosure may be implemented with the changes within the idea and the scope of the present disclosure, as defined by the appended claims and their equivalents.

What is claimed is:

1. A method of saving power in an access point network, the method comprising:

when a user input is not detected for a preset time or longer while access point service is in an activation state in an electronic device, identifying at least one operation for reducing power consumed in association with a function of an access point device;

generating a deactivation request message including information related to disconnection with the access point device and power reduction information instructing the identified at least one operation; and transmitting the generated deactivation request message to the access point device, wherein the generated deactivation request message is transmitted through a second wireless short distance communication scheme different from a first wireless short distance communication scheme corresponding to a data communication scheme used with the access point device, and wherein the power reduction information includes information instructing at least one of an operation of blocking power consumed by a service of the access point device, an operation of switching an access point function to a power sleep state, and an operation of switching the access point function to an idle state.

2. The method of claim 1, wherein the second wireless short distance communication scheme corresponds to at least one of Bluetooth Low Energy (BLE) 4.x, Zigbee, Ultra WideBand (UWB), and Personal Space Communication (PSC).

3. The method of claim 1, further comprising:

when detecting the user input for a preset time or longer, generating an activation request message including information related to an access point service use of the access point device; and transmitting the generated activation request message to the access point device through the wireless short distance communication, wherein the access point device connects with the electronic device in response to the activation request message received from the electronic device.

4. The method of claim 3, wherein the wireless short distance communication corresponds to low power wireless short distance communication.

5. The method of claim 3, wherein a user device operates in at least one of a screen sleep state, a standby state, an idle state, and a deep idle state before the detecting of the user input.

6. A method of saving power in an access point network, the method comprising:

when a deactivation request message, including a power reduction information instructing at least one operation for reducing power consumed in association with a function of an access point device, is received from an electronic device, performing one or more operations related to reduction of power consumed by the access point device, wherein the electronic device transmits, to the access point device, the deactivation request message when a user input is not detected for a preset time or longer while access point service is in an activation state in the electronic device, wherein the generated deactivation request message is transmitted through a second wireless short distance communication scheme different from a first wireless short distance communication scheme corresponding to a data communication scheme used with the access point device, and wherein the power reduction information includes information instructing at least one of an operation of blocking power consumed by a service of the access point device, an operation of switching an access point function to a power sleep state, and an operation of switching the access point function to an idle state.

7. The method of claim 6, wherein the one or more operations are performed according to the power reduction information related to the reduction of the power consumed by the access point device included in the deactivation request message.

8. A non-transitory computer readable recording medium having recorded thereon a program for performing a method of saving power in an access point network, the method comprising:
   when a user input is not detected for a preset time or longer while access point service is in an activation state in an electronic device, identifying at least one operation for reducing power consumed in association with a function of an access point device;
   generating a deactivation request message including information related to disconnection with the access point device and power reduction information instructing the identified at least one operation; and
   transmitting the generated deactivation request message to the access point device,
   wherein the generated deactivation request message is transmitted through a second wireless short distance communication scheme different from a first wireless short distance communication scheme corresponding to a data communication scheme used with the access point device, and
   wherein the power reduction information includes information instructing at least one of an operation of blocking power consumed by a service of the access point device, an operation of switching an access point function to a power sleep state, and an operation of switching the access point function to an idle state.

9. An apparatus for saving power in an access point network, the apparatus comprising:
   a communication unit configured to transmit/receive data to/from an access point device through a wireless short distance communication scheme;
   an input unit configured to receive a user input; and
   a controller configured to:
   when the user input is not detected for a preset time or longer while access point service is in an activation state in an electronic device, generate a deactivation request message including information related to disconnection with the access point device and power reduction information instructing the identified at least one operation, and
   transmit the deactivation request message to the access point device through the communication unit,
   wherein the generated deactivation request message is transmitted through a second wireless short distance communication scheme different from a first wireless short distance communication scheme corresponding to a data communication scheme used with the access point device, and
   wherein the power reduction information includes information instructing at least one of an operation of blocking power consumed by a service of the access point device, an operation of switching an access point function to a power sleep state, and an operation of switching the access point function to an idle state.

10. The apparatus of claim 9, wherein the second wireless short distance communication scheme corresponds to a low power wireless short distance communication scheme.

11. The apparatus of claim 9, wherein the wireless short distance communication scheme corresponds to a low power wireless short distance communication scheme.

* * * * *